United States Patent
Yang et al.

(10) Patent No.: US 9,070,381 B1
(45) Date of Patent: Jun. 30, 2015

(54) MAGNETIC RECORDING READ TRANSDUCER HAVING A LAMINATED FREE LAYER

(71) Applicant: Western Digital (Fremont), LLC, Fremont, CA (US)

(72) Inventors: Cheng-Han Yang, Mountain View, CA (US); Christian Kaiser, San Jose, CA (US); Yuankai Zheng, Fremont, CA (US); Qunwen Leng, Palo Alto, CA (US); Chih-Ching Hu, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/919,782

(22) Filed: Jun. 17, 2013

Related U.S. Application Data

(60) Provisional application No. 61/811,270, filed on Apr. 12, 2013.

(51) Int. Cl.
*G11B 5/39* (2006.01)
*G11B 5/10* (2006.01)

(52) U.S. Cl.
CPC ........................................ *G11B 5/10* (2013.01)

(58) Field of Classification Search
USPC ................................................ 360/324–324.2
See application file for complete search history.

(56) References Cited

U.S. PATENT DOCUMENTS

| | | | |
|---|---|---|---|
| 5,751,521 A * | 5/1998 | Gill | ................. 360/314 |
| 5,764,445 A | 6/1998 | Torng et al. | |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |
| 6,094,803 A | 8/2000 | Carlson et al. | |
| 6,099,362 A | 8/2000 | Viches et al. | |
| 6,103,073 A | 8/2000 | Thayamballi | |

(Continued)

OTHER PUBLICATIONS

RD 457153 A "Dual giant magneto resistor comprises free layer, which is sandwiched between two pinned layers comprising bottom pinned layer having ferromagnet or antiferromagnet and top pinned layer having no antiferromagnet," May 10, 2002, IBM.*

(Continued)

*Primary Examiner* — Will J Klimowicz

(57) ABSTRACT

A method and system provide a magnetic transducer including a first shield, a read sensor, and a second shield. The read sensor is between the first shield and the second shield. The read sensor has a free layer including a plurality of ferromagnetic layers interleaved with and sandwiching at least one additional layer. Each of the ferromagnetic layers includes at least one of Fe, Co and B and has a first corrosion resistance. The additional layer(s) have a second corrosion resistance greater than the first corrosion resistance.

18 Claims, 4 Drawing Sheets

(56) References Cited

U.S. PATENT DOCUMENTS

| | | | |
|---|---|---|---|
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,271,997 B1 | 8/2001 | Gill |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,640 B1 | 11/2001 | Xiao et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,330,542 B1 | 12/2001 | Sevcik et al. |
| 6,333,830 B2 | 12/2001 | Rose et al. |
| 6,340,533 B1 | 1/2002 | Ueno et al. |
| 6,347,049 B1 | 2/2002 | Childress et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,413,325 B1 | 7/2002 | Shimazawa et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,294 B1 | 3/2003 | Arledge, Jr. et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |

(56) References Cited

U.S. PATENT DOCUMENTS

| | | |
|---|---|---|
| 6,661,625 B1 | 12/2003 | Sin et al. |
| 6,674,610 B1 | 1/2004 | Thomas et al. |
| 6,680,831 B2 | 1/2004 | Hiramoto et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,690,163 B1 | 2/2004 | Hoshiya et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,717,686 B1 | 4/2004 | Farros et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,724,581 B2 | 4/2004 | Westwood |
| 6,729,015 B2 | 5/2004 | Matono et al. |
| 6,735,850 B1 | 5/2004 | Gibbons et al. |
| 6,737,281 B1 | 5/2004 | Dang et al. |
| 6,738,236 B1 | 5/2004 | Mao et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,751,073 B2 | 6/2004 | Hasegawa |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,792 B2 | 9/2004 | Takahashi |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,819,532 B2 | 11/2004 | Kamijo |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,841,395 B2 | 1/2005 | Linn et al. |
| 6,848,169 B2 | 2/2005 | Shin et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,876,507 B2 | 4/2005 | Chen et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,937,434 B2 | 8/2005 | Takahashi |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 6,998,150 B2 * | 2/2006 | Li et al. ............... 427/130 |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,042,684 B2 * | 5/2006 | Horng et al. ............ 360/324.1 |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,077,929 B2 | 7/2006 | You et al. |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,130,167 B2 | 10/2006 | Gill |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,141,314 B2 * | 11/2006 | Zhang et al. ............ 428/811.2 |
| 7,149,709 B1 | 12/2006 | Lopez, Jr. |
| 7,154,715 B2 | 12/2006 | Yamanaka et al. |
| 7,160,572 B2 | 1/2007 | Fujikata et al. |
| 7,170,725 B1 | 1/2007 | Zhou et al. |
| 7,177,117 B1 | 2/2007 | Jiang et al. |
| 7,180,716 B2 * | 2/2007 | Li et al. ............... 360/324.12 |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,211,340 B2 | 5/2007 | Nolan |
| 7,212,384 B1 | 5/2007 | Stoev et al. |
| 7,230,264 B2 | 6/2007 | Thean et al. |
| 7,230,265 B2 | 6/2007 | Kaiser et al. |
| 7,236,336 B2 | 6/2007 | Gill |
| 7,238,292 B1 | 7/2007 | He et al. |
| 7,239,478 B1 | 7/2007 | Sin et al. |
| 7,241,631 B2 | 7/2007 | Huai et al. |
| 7,248,431 B1 | 7/2007 | Liu et al. |
| 7,248,433 B1 | 7/2007 | Stoev et al. |
| 7,248,449 B1 | 7/2007 | Seagle |
| 7,256,971 B2 | 8/2007 | Horng et al. |
| 7,270,896 B2 | 9/2007 | Parkin |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |

(56) References Cited

U.S. PATENT DOCUMENTS

| | | | |
|---|---|---|---|
| 7,292,409 B1 | 11/2007 | Stoev et al. | |
| 7,296,339 B1 | 11/2007 | Yang et al. | |
| 7,307,814 B1 | 12/2007 | Seagle et al. | |
| 7,307,818 B1 | 12/2007 | Park et al. | |
| 7,310,204 B1 | 12/2007 | Stoev et al. | |
| 7,318,947 B1 | 1/2008 | Park et al. | |
| 7,333,295 B1 | 2/2008 | Medina et al. | |
| 7,337,530 B1 | 3/2008 | Stoev et al. | |
| 7,342,752 B1 | 3/2008 | Zhang et al. | |
| 7,349,170 B1 | 3/2008 | Rudman et al. | |
| 7,349,179 B1 | 3/2008 | He et al. | |
| 7,349,187 B2 | 3/2008 | Parkin | |
| 7,351,483 B2 | 4/2008 | Parkin | |
| 7,352,541 B2 * | 4/2008 | Gill | 360/324.12 |
| 7,354,664 B1 | 4/2008 | Jiang et al. | |
| 7,363,697 B1 | 4/2008 | Dunn et al. | |
| 7,369,376 B2 | 5/2008 | Guo et al. | |
| 7,371,152 B1 | 5/2008 | Newman | |
| 7,372,665 B1 | 5/2008 | Stoev et al. | |
| 7,375,926 B1 | 5/2008 | Stoev et al. | |
| 7,379,269 B1 | 5/2008 | Krounbi et al. | |
| 7,386,933 B1 | 6/2008 | Krounbi et al. | |
| 7,389,577 B1 | 6/2008 | Shang et al. | |
| 7,417,832 B1 | 8/2008 | Erickson et al. | |
| 7,419,891 B1 | 9/2008 | Chen et al. | |
| 7,423,849 B2 | 9/2008 | Gill | |
| 7,423,850 B2 | 9/2008 | Gill et al. | |
| 7,428,124 B1 | 9/2008 | Song et al. | |
| 7,430,098 B1 | 9/2008 | Song et al. | |
| 7,436,620 B1 | 10/2008 | Kang et al. | |
| 7,436,638 B1 | 10/2008 | Pan | |
| 7,440,220 B1 | 10/2008 | Kang et al. | |
| 7,443,632 B1 | 10/2008 | Stoev et al. | |
| 7,443,639 B2 | 10/2008 | Parkin | |
| 7,444,740 B1 | 11/2008 | Chung et al. | |
| 7,477,491 B2 * | 1/2009 | Li et al. | 360/324.12 |
| 7,488,609 B1 | 2/2009 | Lin et al. | |
| 7,493,688 B1 | 2/2009 | Wang et al. | |
| 7,495,796 B2 | 2/2009 | Keane et al. | |
| 7,505,235 B2 | 3/2009 | Freitag et al. | |
| 7,508,627 B1 | 3/2009 | Zhang et al. | |
| 7,522,377 B1 | 4/2009 | Jiang et al. | |
| 7,522,379 B1 | 4/2009 | Krounbi et al. | |
| 7,522,382 B1 | 4/2009 | Pan | |
| 7,542,246 B1 | 6/2009 | Song et al. | |
| 7,551,406 B1 | 6/2009 | Thomas et al. | |
| 7,552,523 B1 | 6/2009 | He et al. | |
| 7,554,767 B1 | 6/2009 | Hu et al. | |
| 7,580,231 B2 * | 8/2009 | Miyauchi et al. | 360/324.12 |
| 7,583,466 B2 | 9/2009 | Kermiche et al. | |
| 7,595,967 B1 | 9/2009 | Moon et al. | |
| 7,598,579 B2 | 10/2009 | Horng et al. | |
| 7,639,457 B1 | 12/2009 | Chen et al. | |
| 7,660,080 B1 | 2/2010 | Liu et al. | |
| 7,672,080 B1 | 3/2010 | Tang et al. | |
| 7,672,086 B1 | 3/2010 | Jiang | |
| 7,684,160 B1 | 3/2010 | Erickson et al. | |
| 7,684,161 B2 | 3/2010 | Pietambaram et al. | |
| 7,688,546 B1 | 3/2010 | Bai et al. | |
| 7,691,434 B1 | 4/2010 | Zhang et al. | |
| 7,695,761 B1 | 4/2010 | Shen et al. | |
| 7,719,795 B2 | 5/2010 | Hu et al. | |
| 7,726,009 B1 | 6/2010 | Liu et al. | |
| 7,729,086 B1 | 6/2010 | Song et al. | |
| 7,729,087 B1 | 6/2010 | Stoev et al. | |
| 7,736,823 B1 | 6/2010 | Wang et al. | |
| 7,750,421 B2 | 7/2010 | Horng et al. | |
| 7,751,156 B2 | 7/2010 | Mauri et al. | |
| 7,760,474 B1 | 7/2010 | Huai et al. | |
| 7,785,666 B1 | 8/2010 | Sun et al. | |
| 7,796,356 B1 | 9/2010 | Fowler et al. | |
| 7,800,858 B1 | 9/2010 | Bajikar et al. | |
| 7,800,868 B2 | 9/2010 | Gao et al. | |
| 7,819,979 B1 | 10/2010 | Chen et al. | |
| 7,829,264 B1 | 11/2010 | Wang et al. | |
| 7,846,643 B1 | 12/2010 | Sun et al. | |
| 7,855,854 B2 | 12/2010 | Hu et al. | |
| 7,869,160 B1 | 1/2011 | Pan et al. | |
| 7,872,824 B1 | 1/2011 | Macchioni et al. | |
| 7,872,833 B2 | 1/2011 | Hu et al. | |
| 7,910,267 B1 | 3/2011 | Zeng et al. | |
| 7,911,735 B1 | 3/2011 | Sin et al. | |
| 7,911,737 B1 | 3/2011 | Jiang et al. | |
| 7,916,426 B2 | 3/2011 | Hu et al. | |
| 7,916,433 B2 | 3/2011 | Huai et al. | |
| 7,918,013 B1 | 4/2011 | Dunn et al. | |
| 7,929,259 B2 | 4/2011 | Gao et al. | |
| 7,968,219 B1 | 6/2011 | Jiang et al. | |
| 7,982,989 B1 | 7/2011 | Shi et al. | |
| 8,008,912 B1 | 8/2011 | Shang | |
| 8,012,804 B1 | 9/2011 | Wang et al. | |
| 8,015,692 B1 | 9/2011 | Zhang et al. | |
| 8,018,677 B1 | 9/2011 | Chung et al. | |
| 8,018,678 B1 | 9/2011 | Zhang et al. | |
| 8,018,691 B2 * | 9/2011 | Gill et al. | 360/324.12 |
| 8,024,748 B1 | 9/2011 | Moravec et al. | |
| 8,058,697 B2 | 11/2011 | Guo et al. | |
| 8,059,374 B2 | 11/2011 | Zhao et al. | |
| 8,072,705 B1 | 12/2011 | Wang et al. | |
| 8,074,345 B1 | 12/2011 | Anguelouch et al. | |
| 8,077,418 B1 | 12/2011 | Hu et al. | |
| 8,077,434 B1 | 12/2011 | Shen et al. | |
| 8,077,435 B1 | 12/2011 | Liu et al. | |
| 8,077,557 B1 | 12/2011 | Hu et al. | |
| 8,079,135 B1 | 12/2011 | Shen et al. | |
| 8,081,403 B1 | 12/2011 | Chen et al. | |
| 8,091,210 B1 | 1/2012 | Sasaki et al. | |
| 8,097,846 B1 | 1/2012 | Anguelouch et al. | |
| 8,104,166 B1 | 1/2012 | Zhang et al. | |
| 8,116,043 B2 | 2/2012 | Leng et al. | |
| 8,116,171 B1 | 2/2012 | Lee | |
| 8,125,856 B1 | 2/2012 | Li et al. | |
| 8,134,794 B1 | 3/2012 | Wang | |
| 8,136,224 B1 | 3/2012 | Sun et al. | |
| 8,136,225 B1 | 3/2012 | Zhang et al. | |
| 8,136,805 B1 | 3/2012 | Lee | |
| 8,141,235 B1 | 3/2012 | Zhang | |
| 8,146,236 B1 | 4/2012 | Luo et al. | |
| 8,149,536 B1 | 4/2012 | Yang et al. | |
| 8,151,441 B1 | 4/2012 | Rudy et al. | |
| 8,163,185 B1 | 4/2012 | Sun et al. | |
| 8,164,760 B2 | 4/2012 | Willis | |
| 8,164,855 B1 | 4/2012 | Gibbons et al. | |
| 8,164,864 B2 | 4/2012 | Kaiser et al. | |
| 8,165,709 B1 | 4/2012 | Rudy | |
| 8,166,631 B1 | 5/2012 | Tran et al. | |
| 8,166,632 B1 | 5/2012 | Zhang et al. | |
| 8,169,473 B1 | 5/2012 | Yu et al. | |
| 8,171,618 B1 | 5/2012 | Wang et al. | |
| 8,179,636 B1 | 5/2012 | Bai et al. | |
| 8,191,237 B1 | 6/2012 | Luo et al. | |
| 8,194,365 B1 | 6/2012 | Leng et al. | |
| 8,194,366 B1 | 6/2012 | Li et al. | |
| 8,196,285 B1 | 6/2012 | Zhang et al. | |
| 8,200,054 B1 | 6/2012 | Li et al. | |
| 8,203,800 B2 | 6/2012 | Li et al. | |
| 8,208,350 B1 | 6/2012 | Hu et al. | |
| 8,220,140 B1 | 7/2012 | Wang et al. | |
| 8,222,599 B1 | 7/2012 | Chien | |
| 8,225,488 B1 | 7/2012 | Zhang et al. | |
| 8,227,023 B1 | 7/2012 | Liu et al. | |
| 8,228,633 B1 | 7/2012 | Tran et al. | |
| 8,231,796 B1 | 7/2012 | Li et al. | |
| 8,233,248 B1 | 7/2012 | Li et al. | |
| 8,248,896 B1 | 8/2012 | Yuan et al. | |
| 8,254,060 B1 | 8/2012 | Shi et al. | |
| 8,257,597 B1 | 9/2012 | Guan et al. | |
| 8,259,410 B1 | 9/2012 | Bai et al. | |
| 8,259,539 B1 | 9/2012 | Hu et al. | |
| 8,262,918 B1 | 9/2012 | Li et al. | |
| 8,262,919 B1 | 9/2012 | Luo et al. | |
| 8,264,797 B2 | 9/2012 | Emley | |
| 8,264,798 B1 | 9/2012 | Guan et al. | |
| 8,270,126 B1 | 9/2012 | Roy et al. | |

(56) References Cited

U.S. PATENT DOCUMENTS

| | | |
|---|---|---|
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,467,154 B2 * | 6/2013 | Covington et al. ........ 360/324.1 |
| 8,468,682 B1 | 6/2013 | Zhang |
| 8,472,151 B2 * | 6/2013 | Wang et al. ............. 360/324.12 |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 2002/0009616 A1 | 1/2002 | Kamiguchi et al. |
| 2003/0039080 A1 * | 2/2003 | Kagami et al. ............. 360/324.1 |
| 2003/0179071 A1 | 9/2003 | Hiramoto et al. |
| 2004/0056288 A1 | 3/2004 | Fukuzumi |
| 2004/0091744 A1 | 5/2004 | Carey et al. |
| 2004/0219772 A1 | 11/2004 | You et al. |
| 2005/0009211 A1 | 1/2005 | Linn et al. |
| 2005/0120544 A1 | 6/2005 | Lam |
| 2005/0195534 A1 | 9/2005 | Gill |
| 2005/0264951 A1 | 12/2005 | Gill |
| 2006/0071287 A1 | 4/2006 | Yuasa et al. |
| 2006/0093862 A1 | 5/2006 | Parkin |

(56) References Cited

U.S. PATENT DOCUMENTS

| | | | |
|---|---|---|---|
| 2006/0102969 A1 | 5/2006 | Huai et al. | |
| 2006/0114616 A1* | 6/2006 | Sbiaa et al. | 360/324.1 |
| 2006/0128038 A1 | 6/2006 | Pakala et al. | |
| 2006/0141640 A1 | 6/2006 | Huai et al. | |
| 2006/0180839 A1 | 8/2006 | Fukumoto et al. | |
| 2006/0209590 A1 | 9/2006 | Guo et al. | |
| 2007/0074317 A1 | 3/2007 | Pakala et al. | |
| 2007/0111332 A1 | 5/2007 | Zhao et al. | |
| 2007/0139827 A1 | 6/2007 | Gao et al. | |
| 2007/0188945 A1 | 8/2007 | Fuji et al. | |
| 2007/0228501 A1 | 10/2007 | Nakamura et al. | |
| 2007/0243639 A1 | 10/2007 | Pietambaram et al. | |
| 2008/0030907 A1 | 2/2008 | Nakabayashi et al. | |
| 2008/0062581 A1 | 3/2008 | Parkin | |
| 2008/0080101 A1 | 4/2008 | Mauri et al. | |
| 2008/0124454 A1 | 5/2008 | Djayaprawira et al. | |
| 2008/0174921 A1 | 7/2008 | Ikarashi et al. | |
| 2008/0179699 A1 | 7/2008 | Horng et al. | |
| 2008/0182133 A1 | 7/2008 | Shiimoto et al. | |
| 2008/0205130 A1 | 8/2008 | Sun et al. | |
| 2008/0299679 A1 | 12/2008 | Zhao et al. | |
| 2009/0027810 A1 | 1/2009 | Horng et al. | |
| 2009/0027813 A1 | 1/2009 | Carey et al. | |
| 2009/0046397 A1 | 2/2009 | Sun et al. | |
| 2009/0122450 A1 | 5/2009 | Wang et al. | |
| 2010/0073827 A1 | 3/2010 | Zhao et al. | |
| 2010/0255349 A1 | 10/2010 | Gao et al. | |
| 2010/0290157 A1 | 11/2010 | Zhang et al. | |
| 2011/0086240 A1 | 4/2011 | Xiang et al. | |
| 2012/0064640 A1* | 3/2012 | Guo et al. | 438/3 |
| 2012/0111826 A1 | 5/2012 | Chen et al. | |
| 2012/0216378 A1 | 8/2012 | Emley et al. | |
| 2012/0237878 A1 | 9/2012 | Zeng et al. | |
| 2012/0298621 A1 | 11/2012 | Gao | |
| 2013/0175644 A1* | 7/2013 | Horng et al. | 257/421 |
| 2013/0216702 A1 | 8/2013 | Kaiser et al. | |
| 2013/0216863 A1 | 8/2013 | Li et al. | |
| 2013/0257421 A1 | 10/2013 | Shang et al. | |
| 2014/0099735 A1* | 4/2014 | Horng et al. | 438/3 |

OTHER PUBLICATIONS

RD 456184 A "Current perpendicular to the plane dual giant magneto resistance with cobalt iron/copper multilayer free layer," Apr. 10, 2002, IBM.*

Tsunekawa, et al., "Giant tunneling magnetoresistance effect in low-resistance CoFeB/MgO(001)/CoFeB magnetic tunnel junctions for read-head applications", Applied Physics Letters 87,072503, 3 Pages, 2005.

Read, et al., "X-ray photoemission study of CoFeB/MgO thin film bilayers", Applied Physics Letters 90, 132503, 3 Pages, 2007.

Park, et al., "Annealing effects on structural and transport properties of rf-sputtered CoFeB/MgO/CoFeB magnetic tunnel junctions", Journal of Applied Physics 99, 08a901, 3 Pages, 2006.

Park, et al. "Effect of adjacent layers on crystallization and magnetoresistance in CoFeB/MgO/CoFeB Magnetic Tunnel Junction" IEEE Transactions on Magnetics, vol. 42, No. 10, pp. 3639-2641, Oct. 2008.

Djayaprawira, et al., "230% room-temperature magnetoresistance in CoFeB/MgO/CoFeB magnetic tunnel junctions", Applied Physics Letters 86, 092502, 3 pages, 2005.

Tsunekawa, et al., "Huge Magnetoresistance and Low Junction Resistance in Magnetic Tunnel Junctions with Crystalline MgO Barrier", IEEE Transactions on Magnetics, vol. 42, No. 2, pp. 103-107, Feb. 2006.

Burton, et al., "Atomic and Electronic Structure of the CoFeB/MgO Interface From First Principles", Applied Physics Letters 89, 142507, 3 pages, 2006.

Neil Smith, "Fluctuation-dissipation considerations for phenomenological damping models for ferromagnetic thin film," Journal of Applied Physics, Oct. 1, 2002, vol. 92, No. 7, pp. 3877-3885.

Jian-Gang Zhu, "Magnetization Dynamics: Thermal Driven Noise in Magnetoresistive Sensors," Handbook of Magnetism and Advanced Magnetic Material, John Wiley & Sons, Ltd., 2007, 16 pages.

S.W. Sun, et al., "Possible giant surface magnetostriction in amorphous Co76Cr4B20", J. Appl. Phys. 69 (Abstract), Apr. 15, 1991, 5218.

Carey, et al., "High-Output Current-Perpendicular to the Plane Giant Magnetoresistance Sensor with Synthetic-Ferrimagnet Free Layer and Enhanced Spin-Torque Critical Currents", Applied Physics Letters 93, Sep. 10, 2008.

* cited by examiner

MAGNETIC RECORDING READ TRANSDUCER HAVING A LAMINATED FREE LAYER

CROSS-REFERENCE TO RELATED APPLICATIONS

This application claims priority to provisional U.S. Patent Application Ser. No. 61/811,270, filed on Apr. 12, 2013, which is hereby incorporated by reference in its entirety.

BACKGROUND

FIG. 1 depicts an air-bearing surface (ABS) view of a conventional read transducer 10. The conventional read transducer 10 includes shields 12 and 20, sensor 14 and magnetic bias structures 19. The read sensor 14 is typically a giant magnetoresistive (GMR) sensor or tunneling magnetoresistive (TMR) sensor. The read sensor 14 includes an antiferromagnetic (AFM) layer 18, a pinned layer 17, a nonmagnetic spacer layer 16, and a free layer 15. Also shown is a capping layer. In addition, seed layer(s) may be used. The free layer 15 has a magnetization sensitive to an external magnetic field. Thus, the free layer 15 functions as a sensor layer for the magnetoresistive sensor 14. These magnetic bias structures 19 are used to magnetically bias the free layer 15 of the sensor 14.

The conventional free layer 15 consist of a CoFe/CoB bilayer (not separately depicted in FIG. 1). The CoB in the bilayer may aid in obtaining a higher moment and lower magnetostriction in the free layer 15 than would be obtained for NiFe in the free layer 15. The CoB is amorphous as-deposited, which aids in preventing an MgO barrier layer 16 and the free layer 15 from crystalizing in an orientation other than the desired (100) orientation. This is in contrast to other materials such as NiFe which may crystallize the free layer 15 in FCC (111) orientation. Thus, the CoFe/CoB bilayer is desired to be used in the conventional free layer 15.

Although conventional free layers 15 may be desired to include a CoFe/CoB bilayer for the above reasons, such a conventional sensor 14 may be more prone to corrosion during fabrication. The free layer 15 may also be subject to residual stress. Residual stress may be induced during the deposition and post anneal of the CoB portion of the free layer 15, as well as in the following processing. A sufficiently high residual stress might cause the free layer 15 to peel off of the device 10 or to crack. In addition, the electron corrosion potential for the sensor 14 in various developers may significantly influence film corrosion resistance. The CoFe/CoB bilayer may have a high electron corrosion potential for preferred developers. Thus, the sensor 14 is more likely to corrode during fabrication. Improvements in the fabrication and design of the free layer 15 are desired to extend the magnetic transducer 10 to higher densities.

Accordingly, what is needed is a system and method for improving the performance of a magnetic recording read transducer.

DETAILED DESCRIPTION OF THE PREFERRED EMBODIMENTS

Figure 1:
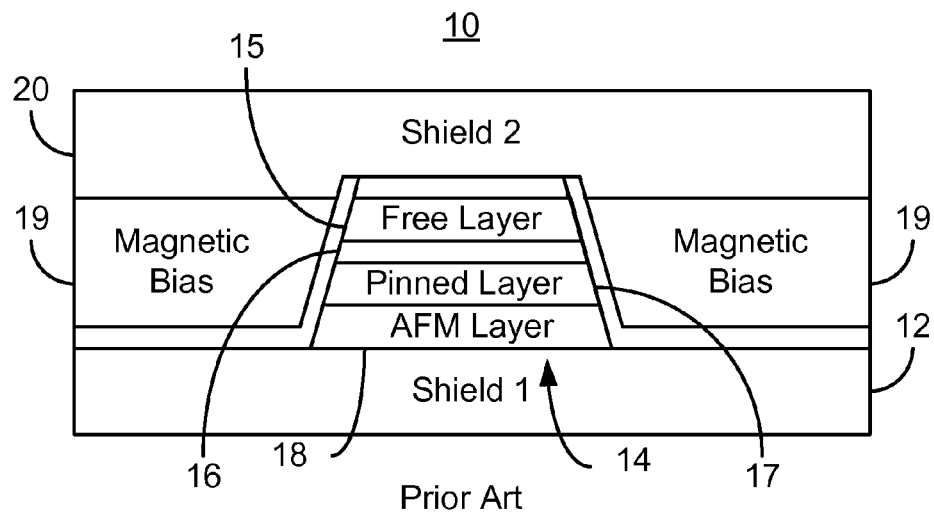
FIG. 1 depicts a conventional read transducer.
Figure 2:
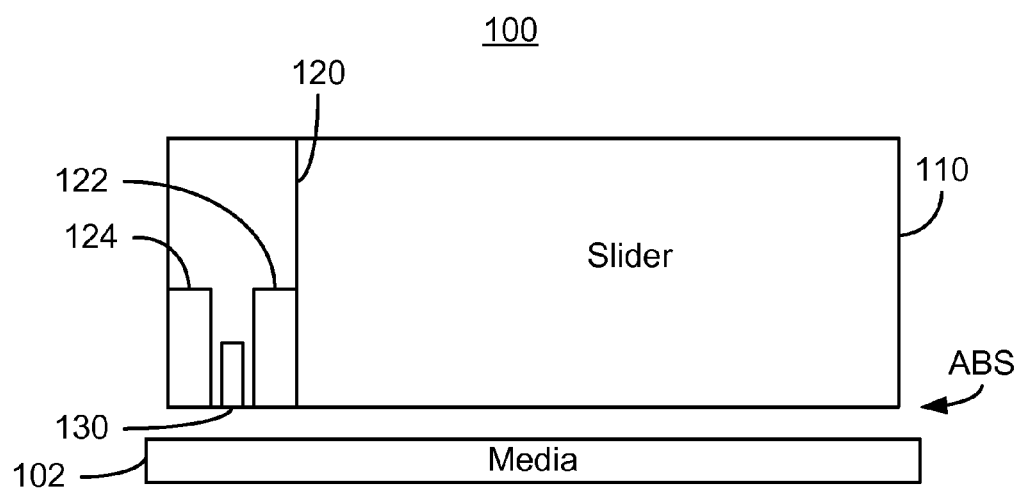
FIG. 2 depicts a side view of an exemplary embodiment of a magnetic recording disk drive.

FIG. 2 depicts a side view of an exemplary embodiment of a portion of a magnetic recording disk drive 100. For clarity, FIG. 2 is not to scale. For simplicity not all portions of the disk drive 100 are shown. In addition, although the disk drive 100 is depicted in the context of particular components other and/or different components may be used. For simplicity, only single components 102, 110, 120, 122, 124 and 130 are shown. However, multiples of each components 102, 110, 120, 122, 124 and/or 130 and their sub-components, might be used.

The disk drive 100 includes media 102, a slider 110, and a read transducer 120. Additional and/or different components may be included in the disk drive 100. For example, a write transducer (not shown) is generally also included. Thus, the slider 110 includes a merged head. The slider 110, and thus the transducer 120 are generally attached to a suspension (not shown). The transducer 120 is fabricated on the slider 110 and includes an air-bearing surface (ABS) proximate to the media 102 during use.

The read transducer 120 includes a first shield 122, a second shield 124 and a read sensor 130. The shields 122 and 124 include soft magnetic material(s) such as NiFe. The read sensor 130 is between the shields 122 and 124. Although shown as separated, in some embodiments, the read sensor 130 is electrically connected to the shields 122 and 124. The read sensor 130 includes a free layer. The free layer includes ferromagnetic layers interleaved with and sandwiching at least one additional layer. Each of the ferromagnetic layers including at least one of Fe, Co and B. Each ferromagnetic layer has a particular corrosion resistance. The additional layer(s) have corrosion resistance(s) that are greater than the corrosion resistance of all of the ferromagnetic layers. For example, the additional layer(s) may include at least one of NiFe, Ru, Ti, Cu, Mg, MgO, Ta, Cr and alumina.

Figure 3:
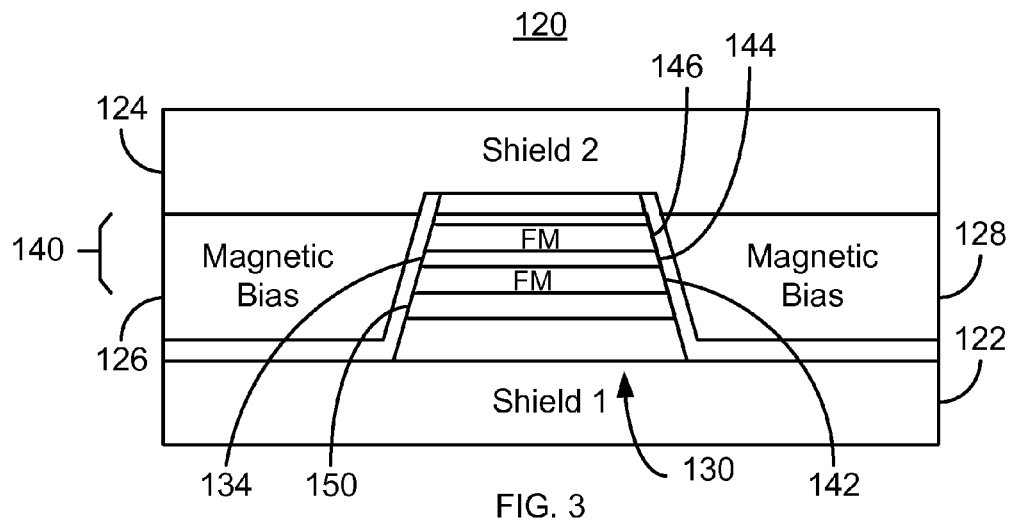
FIG. 3 is an ABS view of an exemplary embodiment of a portion of a magnetic recording read transducer.

FIG. 3 depicts an ABS view of an exemplary embodiment of a portion of the read transducer 120 that may be part of the magnetic recording disk drive 100. For clarity, FIG. 3 is not to scale. For simplicity not all portions of the read transducer 120 are shown. In addition, although the read transducer 120 is depicted in the context of particular components other and/or different components may be used. For simplicity, only single components are shown. However, multiples of each components their sub-components, might be used. Further, analogous components to those depicted in FIG. 2 are labeled similarly.

The read transducer 120 includes a first shield 122, a second shield 124 and a read sensor 130. Also shown are magnetic bias structures 126 and 128. The magnetic bias structures 126 and 128 may be soft or hard bias structures. The magnetic bias structures 126 and 128 are adjacent to the read sensor 130 and between the shields 122 and 124. In some embodiments, the magnetic bias structures 126 and 128 adjoin the read sensor 130. However, in the embodiment shown, the magnetic bias structures 126 and 128 are separated from the read sensor 130 by a thin layer that may be an insulating layer. The shields 122 and 124 may be soft magnetic structures and/or may be antiferromagnetically biased shield(s).

The read sensor 130 is between the shields 122 and 124. The read sensor 130 includes a free layer 140. The read sensor 130 also includes other layers. In some embodiments, these layers include a nonmagnetic spacer layer 134 and a ferromagnetic reference layer 150. The nonmagnetic spacer layer 134 may include a conductor such as Cu, an insulating tunneling barrier layer such as MgO, or other material(s). The reference layer 150 may have its magnetic moment pinned by a pinning layer (not explicitly labeled in FIG. 3). Further, the sensor 130 may include other layer(s).

The free layer 140 includes ferromagnetic layers 142 and 146 interleaved with and sandwiching at least one additional layer 144. The free layer may also include another magnetic layer that adjoins one of the ferromagnetic layers 142 and 146. In some embodiments, this layer is a CoFe layer. Although two magnetic layers 142 and 146 and one additional layer 144 are shown, another number may be used. For example, three ferromagnetic layers sandwiching and interleaved with two additional layers might be used. In other embodiments, five ferromagnetic layers may sandwich and be interleaved with four additional layers.

Each of the ferromagnetic layers 142 and 146 include at least one of Fe, Co and B. In some embodiments, each layer 142 and 146 is a layer of $Co_sFe_tB_u$ where s+t+u=1, s is less than or equal to 1, t is less than or equal to 1, and u is less than or equal to 1. In some embodiments, u is not more than 0.3. In some such embodiments, u is not more than 0.2. In some such embodiments, t is zero, making the ferromagnetic layers 142 and 146 CoB layers. More specifically, each of the ferromagnetic layers 142 and 146 may include $Co_xB_y$, where x+y=1, x is less than or equal to 1, and y is less than or equal to 0.3. In some such embodiments, y is less than or equal to 0.2. In addition, the layer 142 may have a different composition from the layer 146. Each of the ferromagnetic layers 142 and 146 has a corrosion resistance particular to the composition of that layer.

The additional layer 144 is more corrosion resistant than both of the ferromagnetic layers 142 and 146. For example, the additional layer 144 includes at least one of NiFe, Ru, Ti, Cu, Mg, MgO, Ta, Cr and alumina. The additional layer 144 may be at least one-half Angstrom and not more than ten Angstroms thick. For example, in some embodiments, the layer 144 may be at least two Angstroms and not more than four Angstroms. If the additional layer 144 is nonmagnetic, for example Ru, then the thickness of the each of the additional layers may be desired to be sufficiently thin that the ferromagnetic layers 142 and 146 are ferromagnetically coupled. For multiple layers 144, the total thickness of the layer(s) 144 may depend upon the materials used. For example, NiFe is magnetic. As a result, the layers 142 and 146 are ferromagnetically coupled through the layer 144. However, NiFe may decrease the magnetoresistance of the transducer 120. Thus, the total thickness of all of the NiFe layers 144 may be not more than ten or twenty Angstroms. If the layers 144 are Ru, the ferromagnetic layers 142 and 146 may be RKKY coupled through the layer 144. Thus, the total thickness may be up to fifty Angstroms as long as each layer 144 is sufficiently thin that the ferromagnetic layers 142 and 146 are ferromagnetically coupled.

Thus, the free layer 140 of the disk drive 100 is a laminated free layer having ferromagnetic layers 142 and 146 laminated and interleaved with additional layer 144. The laminated free layer 140 may provide several benefits to the transducer 120 and, therefore, the disk drive 100. The free layer 140 may have a decreased corrosion potential. The reduction in corrosion potential may be due to fewer defects such as reduced corrosion, delamination, scratches and particles of devices on shield 124. For example, with either NiFe or Ru used for the layer 144, the counts of such defects may be suppressed. Using the layer 144, the corrosion potential of the free layer 140 may be brought closer to zero. The free layer 140 may have a larger capability to resist the corrosion due to solutions used in processing. The ability of the free layer 140 to resist corrosion may also be due to the laminations 142, 144 and 146. Each of the ferromagnetic layers 142 and 146 is thinner than a single layer having the same amount of ferromagnetic material. As a result, each of the ferromagnetic layers 142 and 146 present a smaller side surface to the solutions which may corrode the layer. Consequently, these layers 142 and 146 may be less prone to the lateral propagation of corrosion through the layer. The layers 142 and 146 may, therefore, be more corrosion resistant than a single layer having the same total amount of ferromagnetic material. Thus, performance and manufacturability of the free layer 140, and thus the magnetic transducer 120, may be improved. Note that the free layer 140 has laminations of the materials in the layers 142, 144 and 146 rather than an alloy of these materials. As a result, the damping constant for the layers 142 and 146 may be reduced from that which may be achieved through an alloy. The free layer 140 may also have a sufficiently high yield in fabrication for use in devices.

Figure 4:
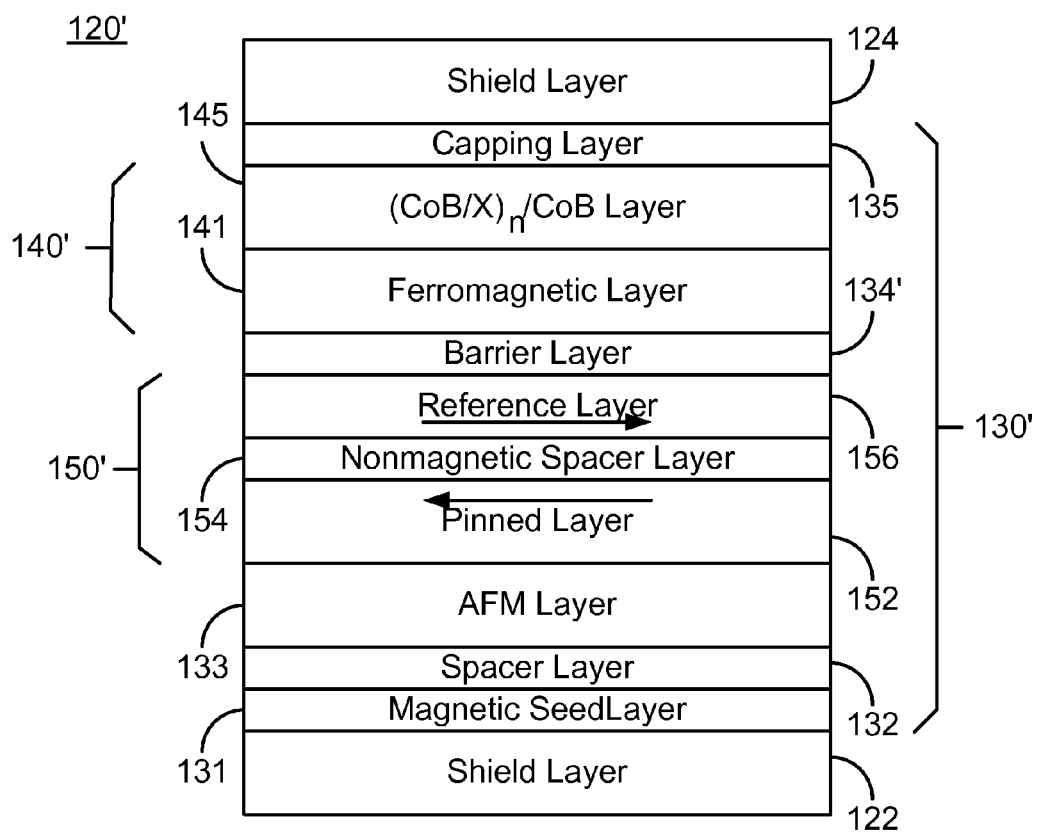
FIG. 4 depicts an ABS view of another exemplary embodiment of a portion of a magnetic recording read transducer.

FIG. 4 depicts an ABS view of an exemplary embodiment of a portion of the read transducer 120' that may be part of the magnetic recording disk drive 100. The transducer 120' is thus analogous to the transducer 120 depicted in FIGS. 2-3. For clarity, FIG. 4 is not to scale. For simplicity not all portions of the read transducer 120' are shown. In addition, although the read transducer 120' is depicted in the context of particular components other and/or different components may be used. For simplicity, only single components are shown. However, multiples of each components their sub-components, might be used. Further, analogous components to those depicted in FIGS. 2 and 3 are labeled similarly.

The read transducer 120' includes a first shield 122, a second shield 124 and a read sensor 130' that are analogous to the shields 122 and 124 and the read sensor 130, respectively. Any magnetic bias structures are not shown in FIG. 4. The read sensor 130' a magnetic seed layer 131, a spacer layer 132, a pinning layer 133, magnetic reference layer 150', barrier layer 134', free layer 140' and capping layer 135. The magnetic reference layer 150', barrier layer 134' and free layer 140' are analogous to the reference layer 150, nonmagnetic layer 134 and free layer 140, respectively. The barrier layer 134' is an insulating tunneling barrier layer such as MgO. The reference layer 150' is a synthetic reference layer 150'. Thus, the reference layer 150' includes two ferromagnetic layers 152 and 156 separated by a nonmagnetic spacer layer 154 such as Ru. The pinned layer 152 has its magnetic moment pinned by the pinning layer 144. In the embodiment shown, the pinning layer 133 is an antiferromagnetic (AFM) layer. In some embodiments, the AFM layer 133 includes IrMn.

The free layer 140 includes a ferromagnetic layer 141 and lamination layer 145. The ferromagnetic layer 141 may be a CoFe layer and adjoins the lamination layer 145. The CoFe 141 layer may also be desired to be closer to the barrier layer 134' than the lamination layer 145.

The lamination layer 145 includes multiple ferromagnetic layers that are interleaved with and sandwich additional layers. In its simplest form, the lamination 145 includes the layers 142, 144 and 146 shown in FIG. 3. In some embodiments, as depicted in FIG. 4, the ferromagnetic layers are CoB layers. Thus, the lamination may include n layers of $Co_xB_y$ that are interleaved with layers of X. This is denoted by the $(CoB/X)_n$ in FIG. 4. Further, another $Co_xB_y$ layer is placed such that the X layers are sandwiched by the $Co_xB_y$ layers. This is shown by the CoB in FIG. 4. Note that x+y=1, where x and y are each less than one. In some embodiments, x is less than or equal to 1, and y is less than or equal to 0.3. In some such embodiments, y is less than or equal to 0.2. However, other materials, including but not limited to CoFeB, may be used in the free layer 140'. Each of the $Co_xB_y$ layers in the lamination 145 has a corrosion resistance.

The layer(s) X are analogous to additional layer 144. Thus, X has a higher corrosion resistance than any of the $Co_xB_y$ layers. For example, in some embodiments X includes at least one of NiFe, Ru, Ti, Cu, Mg, MgO, Ta, Cr and alumina. The layer X may be at least one-half Angstrom and not more than ten Angstroms thick. In some embodiments, each layer X may be at least two Angstroms and not more than four Angstroms. The thickness of the each layer X may be desired to be sufficiently thin that the $Co_xB_y$ layers are ferromagnetically coupled. The same considerations for the X layer(s) may apply as discussed above. Further, individual $Co_xB_y$ layers may differ in composition. Similarly, different X layer(s) may also differ in composition.

The free layer 140' a laminated free layer including lamination layer 145 and ferromagnetic layer 141. The free layer 140' and read transducer 120' may share the benefits of the free layer 140 and transducer 120. For example, the free layer 140' may have enhanced resistance to corrosion from various solutions used in fabrication of the transducer 120'. Thus, performance and manufacturability of the free layer 140', and thus the magnetic transducer 120', may be improved. The free layer 140' may also have a sufficiently high yield in fabrication for use in devices.

Figure 5:
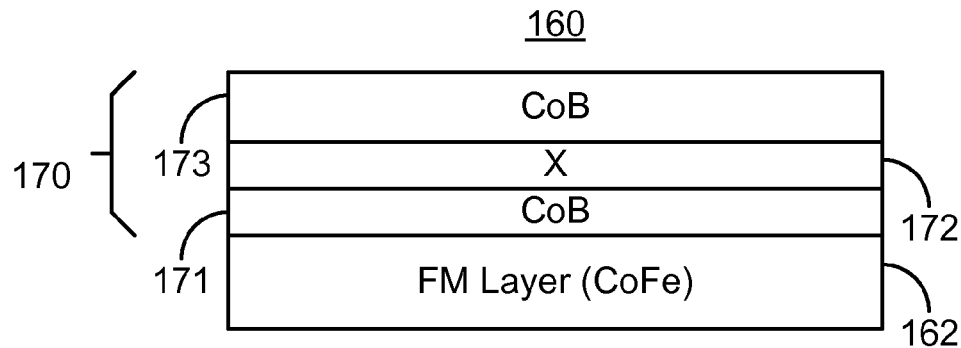
FIG. 5 depicts an exemplary embodiment of a free layer.

FIG. 5 depicts an ABS view of an exemplary embodiment of a free layer 160 that may be used in the read transducer 120 and/or 120'. The free layer 160 is thus analogous to the free layer(s) 140/140' depicted in FIGS. 2-4. For clarity, FIG. 5 is not to scale. In addition, although the free layer 160 is depicted in the context of particular components other and/or different components may be used. For simplicity, only single components are shown. However, multiples of each components their sub-components, might be used.

Referring to FIGS. 2-5, the free layer 160 includes a ferromagnetic layer 162 and lamination 170 analogous to the structures 141 and 145, respectively. The ferromagnetic layer 162 may be a CoFe layer and adjoins the lamination 170. The CoFe 162 layer may also be desired to be closer to the barrier layer 134/134' than the lamination layer 170.

The lamination layer 170 includes two ferromagnetic layers 171 and 173 that are interleaved with and sandwich the X layer 172. The layers 171 172 and 173 of the lamination 170 are thus analogous to the layers 142, 144 and 146 shown in FIG. 3. In some embodiments, as depicted in FIG. 5, the layers 171 and 173 are $Co_xB_y$ layers. Note that x+y=1, where x and y are each less than one. In some embodiments, x is less than or equal to 1, and y is less than or equal to 0.3. In some such embodiments, y is less than or equal to 0.2. However, other materials, including but not limited to CoFeB, may be used in the free layer 160.

The X layer 172 is analogous to additional layer 144. The corrosion resistance of the X layer 172 is greater than the corrosion resistance of the ferromagnetic layers 171 and 173. Thus, X may include at least one of NiFe, Ru, Ti, Cu, Mg, MgO, Ta, Cr and alumina. The X layer 172 may be at least one-half Angstrom and not more than ten Angstroms thick. In some embodiments, the X layer 172 may be at least two Angstroms and not more than four Angstroms. The layer 172 may be desired to be sufficiently thin that the $Co_xB_y$ layers 171 and 173 are ferromagnetically coupled. The same considerations for the X layer 172 may apply as discussed above. Further, individual $Co_xB_y$ layers 171 and 173 may differ in composition.

The free layer 160 a laminated free layer including lamination 170 and ferromagnetic layer 162. The free layer 160 may share the benefits of the free layer(s) 140/140' and transducer(s) 120/120'. For example, the free layer 160 may have enhanced resistance to corrosion from solution(s) used in fabrication. Thus, performance and manufacturability of the free layer 160, and thus the magnetic transducer 120/120', may be improved. The free layer 160 may also have a sufficiently high yield in fabrication for use in devices.

Figure 6:
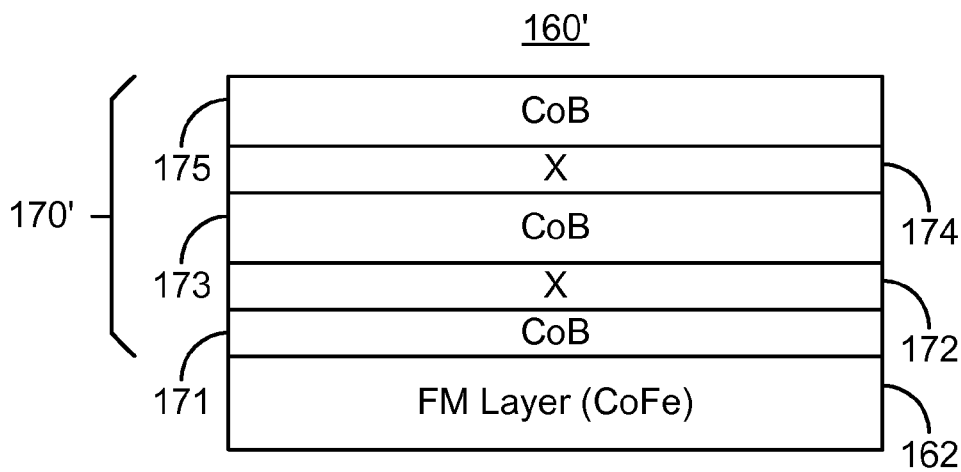
FIG. 6 depicts another exemplary embodiment of a free layer.

FIG. 6 depicts an ABS view of an exemplary embodiment of a free layer 160' that may be used in the read transducer 120 and/or 120'. The free layer 160' is thus analogous to the free layer(s) 140/140'/160 depicted in FIGS. 2-5. For clarity, FIG. 6 is not to scale. In addition, although the free layer 160' is depicted in the context of particular components other and/or different components may be used. For simplicity, only single components are shown. However, multiples of each components their sub-components, might be used.

Referring to FIGS. 2-6, the free layer 160' includes a ferromagnetic layer 162 and lamination 170' analogous to the structures 141/162 and 145/170, respectively. The ferromagnetic layer 162 may be a CoFe layer and adjoins the lamination 170'. The CoFe 162 layer may also be desired to be closer to the barrier layer 134/134' than the lamination layer 170'.

The lamination layer 170' includes three ferromagnetic layers 171, 173 and 175 that are interleaved with and sandwich the X layers 172 and 174. In some embodiments, as depicted in FIG. 6, the layers 171 and 173 are $Co_xB_y$ layers. Note that x+y=1, where x and y are each less than one. In some embodiments, x is less than or equal to 1, and y is less than or equal to 0.3. In some such embodiments, y is less than or equal to 0.2. However, other materials, including but not limited to CoFeB, may be used in the free layer 160'.

The X layers 172 and 174 are each analogous to additional layer 144. The corrosion resistances of the X layers 172 and 174 are greater than the corrosion resistance of the ferromagnetic layers 171 and 173 and 175. Thus, X may include at least one of NiFe, Ru, Ti, Cu, Mg, MgO, Ta, Cr and alumina. Each of the X layers 172 and 174 may be at least one-half Angstrom and not more than ten Angstroms thick. In some embodiments, each X layer 172 and 174 may be at least two Angstroms and not more than four Angstroms. Each X layer 172 and 174 may be desired to be sufficiently thin that the $Co_xB_y$ layers 171, 173 and 175 are ferromagnetically coupled. The same considerations for the X layers 172 and 174 may apply as discussed above. Further, individual $Co_xB_y$ layers 171, 173 and 175 may differ in composition. Similarly, different X layers 171, 173 and 175 may also differ in composition.

The free layer 160' a laminated free layer including lamination 170' and ferromagnetic layer 162. The free layer 160' may share the benefits of the free layer(s) 140/140'/160 and transducer(s) 120/120'. For example, the free layer 160' may have enhanced resistance to corrosion from solution(s) used in fabrication. Performance and manufacturability of the free layer 160', and thus the magnetic transducer 120/120', may be improved. The free layer 160' may also have a sufficiently high yield in fabrication for use in devices.

Figure 7:
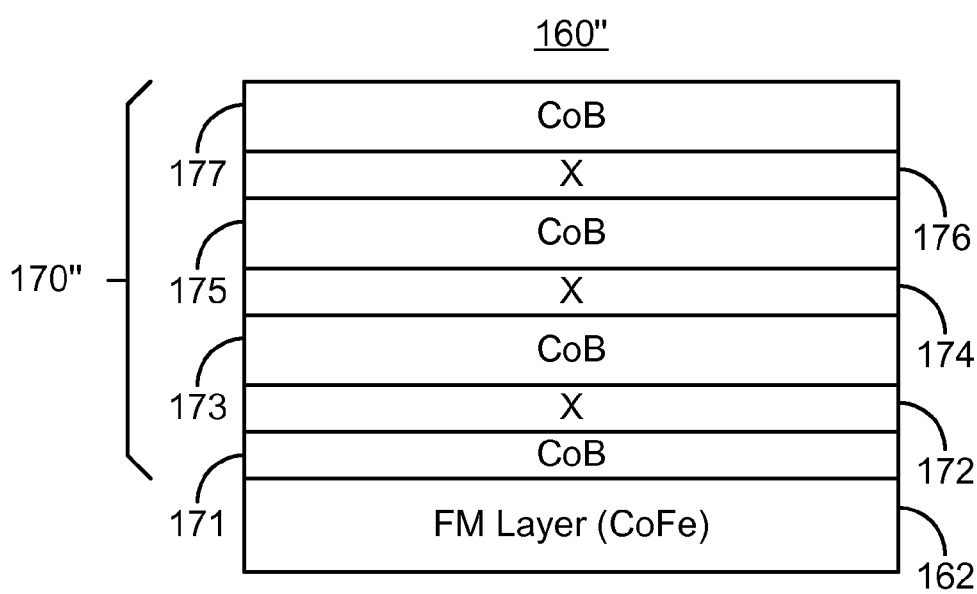
FIG. 7 depicts another exemplary embodiment of a free layer.

FIG. 7 depicts an ABS view of an exemplary embodiment of a free layer 160" that may be used in the read transducer 120 and/or 120'. The free layer 160" is thus analogous to the free layer(s) 140/140'/160/160' depicted in FIGS. 2-6. For clarity, FIG. 7 is not to scale. In addition, although the free layer 160" is depicted in the context of particular components other and/or different components may be used. For simplicity, only single components are shown. However, multiples of each components their sub-components, might be used.

Referring to FIGS. 2-7, the free layer 160" includes a ferromagnetic layer 162 and lamination 170" analogous to the structures 141/162 and 145/170/170', respectively. The ferromagnetic layer 162 may be a CoFe layer and adjoins the lamination 170". The CoFe 162 layer may also be desired to be closer to the barrier layer 134/134' than the lamination layer 170".

The lamination layer 170" includes four ferromagnetic layers 171, 173, 175 and 177 that are interleaved with and sandwich the X layers 172, 174 and 176. In some embodiments, as depicted in FIG. 7, the layers 171, 173 and 175 are $Co_xB_y$ layers. Note that x+y=1, where x and y are each less than one. In some embodiments, x is less than or equal to 1, and y is less than or equal to 0.3. In some such embodiments, y is less than or equal to 0.2. However, other materials, including but not limited to CoFeB, may be used in the free layer 160".

The X layers 172, 174 and 176 are each analogous to additional layer 144. The corrosion resistances of the X layers 172, 174 and 176 are greater than the corrosion resistance of the ferromagnetic layers 171, 173, 175 and 177. Thus, X may include at least one of NiFe, Ru, Ti, Cu, Mg, MgO, Ta, Cr and alumina. Each of the X layers 172, 174 and 176 may be at least one-half Angstrom and not more than ten Angstroms thick. In some embodiments, each X layer 172, 174 and 176 may be at least two Angstroms and not more than four Angstroms. Each X layer 172, 174 and 176 may be desired to be sufficiently thin that the $Co_xB_y$ layers 171, 173, 175 and 177 are ferromagnetically coupled. The same considerations for the X layers 172, 174 and 176 may apply as discussed above. Further, individual $Co_xB_y$ layers 171, 173, 175 and 177 may differ in composition. Similarly, different X layers 171, 173, 175 and 177 may also differ in composition.

The free layer 160" a laminated free layer including lamination 170" and ferromagnetic layer 162. The free layer 160" may share the benefits of the free layer(s) 140/140'/160/160' and transducer(s) 120/120'. For example, the free layer 160" may have enhanced resistance to corrosion from solution(s) used in fabrication. Performance and manufacturability of the free layer 160", and thus the magnetic transducer 120/120', may be improved. The free layer 160" may also have a sufficiently high yield in fabrication for use in devices.

Figure 8:
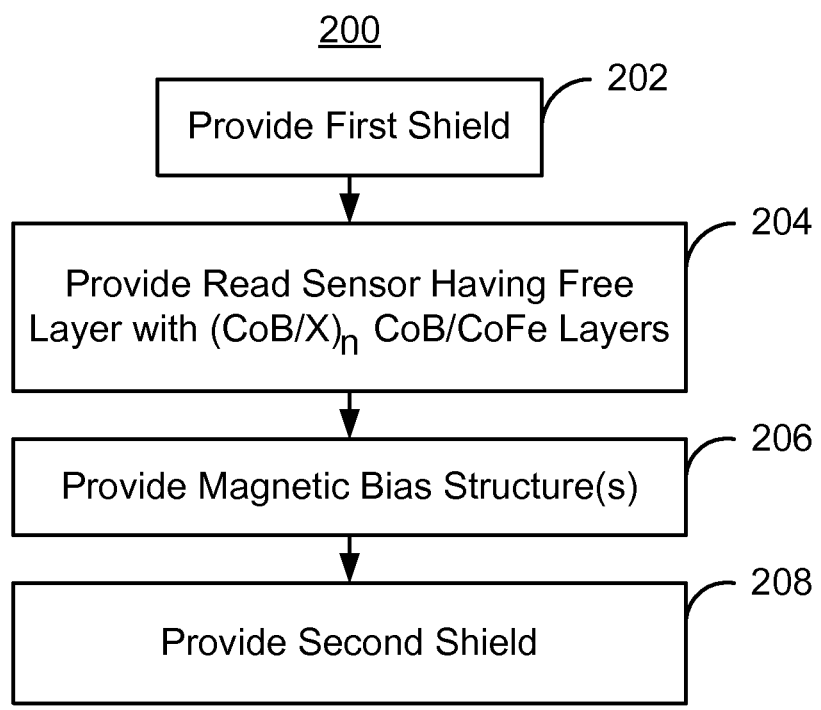
FIG. 8 is flow chart depicting an exemplary embodiment of a method for fabricating a magnetic recording read transducer.

FIG. 8 is an exemplary embodiment of a method 200 for providing a read transducer including a laminated free layer. For simplicity, some steps may be omitted, interleaved, and/or combined. The method 200 is also described in the context of providing a single recording transducer 120' and free layer 140' depicted in FIG. 4. However, the method 200 may be used to fabricate multiple transducers at substantially the same time. The method 200 may also be used to fabricate other transducers and other free layers including but not limited to any combination of 120, 120', 140, 140', 160, 160' and/or 160". The method 200 is also described in the context of particular layers. A particular layer may include multiple materials and/or multiple sub-layers. The method 200 also may start after formation of other portions of the magnetic recording transducer.

The first shield 122 is provided, via step 202. Step 202 typically includes depositing a large high permeability layer. The read sensor 130 is provided, via step 204. Step 204 typically includes depositing the layers for the sensor 130, then defining the sensor 130 in at least the track width direction using an ion mill. More specifically, step 204 includes providing a read sensor 130' including a free layer 140' including a plurality of ferromagnetic layers interleaved with and sandwiching at least one additional layer. Each of the ferromagnetic layers includes at least one of Fe, Co and B. Each of the additional layer(s) has a higher corrosion resistance than all of the ferromagnetic layers. The layer(s) may include at least one of NiFe, Ru, Ti, Cu, Mg, MgO, Ta, Cr and alumina. Thus, step 204 includes forming the lamination 145 that may include CoB layers. Step 204 may also include forming the ferromagnetic layer 141 of the free layer 140. In addition, layers 131, 132, 133, 150/150', 134/134' and 135 may also be formed. In other embodiments, other and/or additional layer(s) may be formed in step 204.

The magnetic bias structures (not shown in FIG. 4) are provided, via step 206. The magnetic bias structures 130 may be soft magnetic bias structures. Step 206 may thus include forming structures 126 and 128 and/or analogous components.

The shield 124 is provided in step 208. Thus, the benefits of the magnetic transducer 120/120', sensor 130/130' and free layer(s) 140, 140', 160, 160', 160" and/or 160" may be achieved.

We claim:

1. A magnetic transducer having an air-bearing surface (ABS) and comprising:
   a first shield;
   a second shield; and
   a read sensor between the first shield and the second shield, the read sensor including a free layer including a plurality of ferromagnetic layers interleaved with and sandwiching at least one additional layer, each of the plurality of ferromagnetic layers including B and at least one of Fe and Co, each of the ferromagnetic layers having a first corrosion resistance, the at least one additional layer has a second corrosion resistance greater than the first corrosion resistance, the at least one additional layer including at least one of NiFe, Ru, Ti, Mg, MgO, Ta, Cr and alumina, the free layer further including a magnetic layer including CoFe and adjoining one of the plurality of ferromagnetic layers.

2. The magnetic transducer of claim 1 wherein the read sensor includes a nonmagnetic spacer layer and a ferromagnetic reference layer, the nonmagnetic spacer layer being between the free layer and the ferromagnetic reference layer.

3. The magnetic transducer of claim 1 wherein the read sensor includes at least one edge, the magnetic transducer further comprising:
   at least one magnetic bias structure adjacent to the at least one edge and residing between the first shield and the second shield.

4. The magnetic transducer of claim 1 wherein the each of the plurality of ferromagnetic layer includes $Co_xB_z$ where x+z=1, x is less than 1 and z is less than 1 and greater than 0.

5. The magnetic transducer of claim 4 wherein z is less than or equal to 0.3.

6. The magnetic transducer of claim 4 wherein z is less than or equal to 0.2.

7. The magnetic transducer of claim 1 wherein the at least one additional layer is at least one-half Angstrom and not more than ten Angstroms thick.

8. The magnetic transducer of claim 7 wherein the at least one additional layer is at least two Angstroms thick and not more than four Angstroms thick.

9. The magnetic transducer of claim 1 of wherein the plurality of ferromagnetic layers includes a first ferromagnetic layer having a first composition and a second ferromagnetic layer having a second composition equal to the first composition.

10. A magnetic transducer having an air-bearing surface (ABS) and comprising:
a first shield;
a second shield; and
a read sensor between the first shield and the second shield, the read sensor including a free layer including a CoFe magnetic layer and a plurality of ferromagnetic layers interleaved with and sandwiching at least one additional layer, each of the plurality of ferromagnetic layers including $Co_xB_y$, where x+y=1, x is less than 1, and y is less than or equal to 0.2 and greater than zero, the at least one additional layer including at least one of NiFe, Ru, Ti, Mg, MgO, Ta, Cr and alumina.

11. A disk drive comprising:
a media;
a slider including a magnetic read transducer having an air-bearing surface (ABS), the slider including a magnetic transducer having a first shield, a second shield, and a read sensor between the first shield and the second shield, the read sensor including a free layer including a CoFe magnetic layer, a plurality of ferromagnetic layers interleaved with and sandwiching at least one additional layer, each of the plurality of ferromagnetic layers including B and at least one of Fe and Co and having a first corrosion resistance, the at least one additional layer having a second corrosion resistance greater than the first corrosion resistance, the at least one additional layer including at least one of NiFe, Ru, Ti, Mg, MgO, Ta, Cr and alumina.

12. A method for providing a magnetic transducer having an air-bearing surface (ABS) and comprising:
providing a first shield;
providing a second shield; and
providing a read sensor between the first shield and the second shield, the read sensor including a free layer including a CoFe magnetic layer, a plurality of ferromagnetic layers interleaved with and sandwiching at least one additional layer, each of the plurality of ferromagnetic layers including B and at least one of Fe and Co and having a first corrosion resistance, the at least one additional layer having a second corrosion resistance greater than the first corrosion resistance, the at least one additional layer including at least one of NiFe, Ru, Ti, Mg, MgO, Ta, Cr and alumina, the CoFe magnetic layer adjoining one of the plurality of ferromagnetic layers.

13. The method of claim 12 wherein the read sensor includes a nonmagnetic spacer layer and a ferromagnetic reference layer, the nonmagnetic spacer layer being between the free layer and the ferromagnetic reference layer.

14. The method of claim 13 wherein the each of the plurality of ferromagnetic layer includes $Co_xB_z$ where x+z=1, x is less than 1 and z is less than 1 and greater than 0.

15. The method of claim 14 wherein z is less than or equal to 0.2.

16. The method of claim 12 wherein the at least one additional layer is at least one-half Angstrom and not more than ten Angstroms thick.

17. The method of claim 16 wherein the at least one additional layer is at least two Angstroms thick and not more than four Angstroms thick.

18. The method of claim 12 of wherein the plurality of ferromagnetic layers includes a first ferromagnetic layer having a first composition and a second ferromagnetic layer having a second composition equal to the first composition.

* * * * *